United States Patent
Stewart

(10) Patent No.: US 7,894,607 B1
(45) Date of Patent: Feb. 22, 2011

(54) SYSTEM, METHOD AND MEDIA DRIVE FOR SELECTIVELY ENCRYPTING A DATA PACKET

(75) Inventor: Alexander S. Stewart, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 1288 days.

(21) Appl. No.: 11/372,690

(22) Filed: Mar. 10, 2006

(51) Int. Cl.
*H04L 9/08* (2006.01)

(52) U.S. Cl. ............... 380/280; 380/277; 380/278; 380/279; 380/281; 380/282; 380/283; 380/284; 713/150; 713/160; 713/189; 713/190; 713/191; 713/192; 713/193; 709/229

(58) Field of Classification Search ......... 380/255–284, 380/28–30; 713/150–154, 160–167, 189–193, 713/155–159; 709/229; 726/26, 30; 707/1
See application file for complete search history.

(56) References Cited

U.S. PATENT DOCUMENTS

| | | | | |
|---|---|---|---|---|
| 5,548,646 A | * | 8/1996 | Aziz et al. | 713/153 |
| 5,995,624 A | * | 11/1999 | Fielder et al. | 713/169 |
| 6,192,130 B1 | * | 2/2001 | Otway | 380/277 |
| 6,370,249 B1 | * | 4/2002 | Van Oorschot | 380/277 |

FOREIGN PATENT DOCUMENTS

WO   WO 0241101   * 5/2002

* cited by examiner

*Primary Examiner*—Taghi T Arani
*Assistant Examiner*—Josnel Jeudy
(74) *Attorney, Agent, or Firm*—Brooks Kushman P.C.

(57) ABSTRACT

A system, method and media drive for selectively encrypting a data packet. The system includes an encryption key for use in encrypting the data packet, a verification data element derived from the encryption key, an encryption engine for selectively encrypting the data packet using the encryption key, and a verification engine in electronic communication with the encryption engine. The verification engine is configured to receive the encryption key and the verification data element, determine when the verification data element corresponds to the encryption key as received by the verification engine, and prohibit encryption of the data packet by the encryption engine when the verification data element does not correspond to the encryption key as received by the verification engine.

14 Claims, 2 Drawing Sheets

SYSTEM, METHOD AND MEDIA DRIVE FOR SELECTIVELY ENCRYPTING A DATA PACKET

BACKGROUND OF THE INVENTION

1. Field of the Invention

The present invention relates to a system, method and media drive for selectively encrypting a data packet.

2. Background Art

Encryption of a data packet is generally performed using an encryption key. A data packet that has been encrypted using a particular encryption key is unintelligible until the data packet is subsequently decrypted using the particular encryption key. Accordingly, it is important that the encryption key used to encrypt the data packet be known at the time of decryption. If the encryption key used to encrypt the data packet is not known at the time of decryption, the strength of the encryption algorithm will result, in effect, in the inability to recover the encrypted data.

The encryption key is generally assigned (i.e., generated, identified, selected, etc.) for use during encryption and is then generally transmitted to the encryption engine where it may be stored locally for subsequent encryption of data packets. If the encryption key is corrupted at any point prior to the encryption of a particular data packet, the encryption key used to generate the resulting cipher text (i.e., corresponding encrypted data packet) will be unknown since the corrupted value will not match the original assigned value. Since the encryption key used to encrypt the particular data packet will not be determinable at the time of decryption, the strength of the encryption algorithm will result in an effective loss (i.e., unrecoverability) of the encrypted data.

Accordingly, it may be desirable to have a system, method and/or media drive for selectively encrypting a data packet. Such a system, method and/or media drive may, among other benefits, reduce data loss by verifying the validity of an encryption key prior to the encryption of a particular data packet.

SUMMARY OF THE INVENTION

According to the present invention, a system for selectively encrypting a data packet is provided. The system comprises an encryption key for use in encrypting the data packet, a verification data element derived from the encryption key, an encryption engine for selectively encrypting the data packet using the encryption key, and a verification engine in electronic communication with the encryption engine. The verification engine is configured to receive the encryption key and the verification data element, determine when the verification data element corresponds to the encryption key as received by the verification engine, and prohibit encryption of the data packet by the encryption engine when the verification data element does not correspond to the encryption key as received by the verification engine.

Also according to the present invention, a method for selectively encrypting a data packet using an encryption key is provided. The method comprises deriving a verification data element corresponding to the encryption key prior to transmitting the encryption key to an encryption engine, transmitting the encryption key and the verification data element to the encryption engine, determining when encryption of the data packet is desired, determining if the verification data element corresponds to the encryption key when encryption of the data packet is desired, and prohibiting encryption of the data packet by the encryption engine when encryption of the data packet is desired and the verification data element does not correspond to the encryption key.

Still further according to the present invention, a media drive for selectively encrypting a data packet using an encryption key is provided. The media drive comprises a memory device for storing the encryption key and a verification data element predetermined using the encryption key, an encryption engine in electronic communication with the memory device for selectively encrypting the data packet using the encryption key, and a verification engine in electronic communication with the encryption engine. The verification engine is configured to receive the encryption key and the verification data element, determine when the verification data element corresponds to the encryption key as received by the verification engine, and prohibit encryption of the data packet by the encryption engine when the verification data element does not correspond to the encryption key as received by the verification engine.

DETAILED DESCRIPTION

Figure 1:
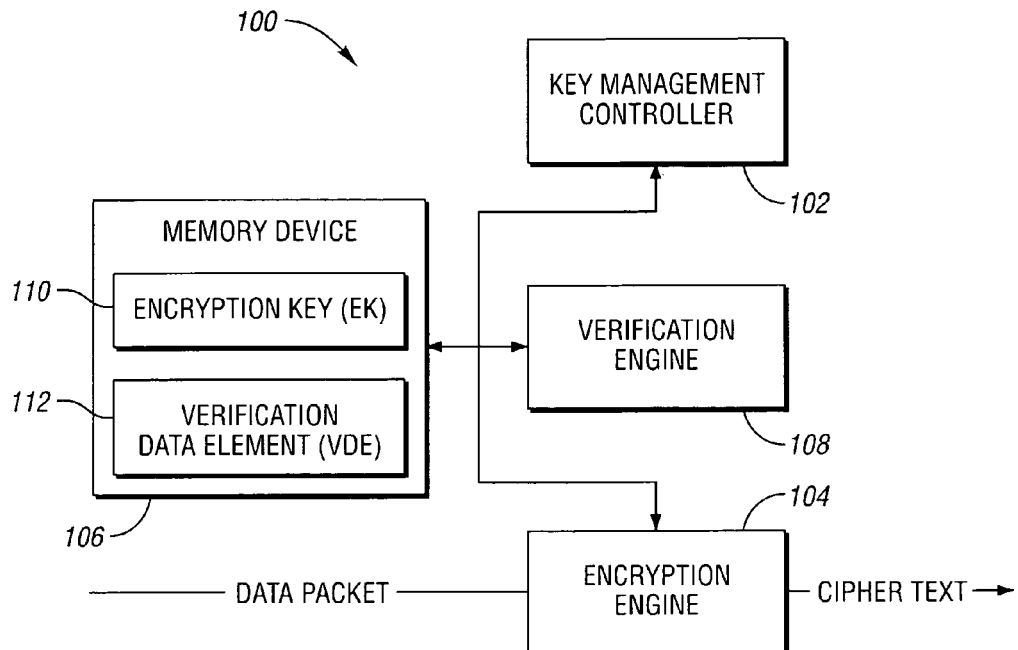
FIG. 1 is a schematic diagram of a system for selectively encrypting a data packet according to an embodiment of the present invention.

Referring to FIG. 1, a schematic diagram is provided of a system 100 for selectively encrypting a data packet according to an embodiment of the present invention. The system 100 may include a key management controller 102, an encryption engine 104, a memory device 106, and/or a verification engine 108.

In general, the key management controller (i.e., KMC) 102 may be a computer or other logical device which executes application programs and/or which performs other logical exercises to generate, assign, select, and/or otherwise identify an encryption key (i.e., EK) 110 for use by the encryption engine 104 during encryption of a data packet. Furthermore, in accordance with one or more embodiments of the present invention, the key management controller 102 may also derive (i.e., generate, determine, etc.) a verification data element 112 from (i.e., based at least in part on) the encryption key 110. In general, the key management controller 102 may derive the verification data element (i.e., VDE) 112 using any appropriate algorithm, such as a Cyclic Redundancy Check algorithm, and/or any other appropriate technique to meet the design criteria of a particular application. If the key transmissions from the key management controller 102 are protected using one or more layers of encryption and the encryption mode used for such protection includes the generation of an encryption tag, this encryption tag may act as the verification data element 112 alone or in addition to the Cyclic Redundancy Check algorithm. In at least one embodiment, the verification data element 112 may be logically coupled (e.g., appended, prefixed, attached, integrated, etc.) to the encryption key 110 such that the verification data element 112 may be transmitted and/or otherwise conveyed with the Encryption key 110 as a single data unit.

It is contemplated that all or part of the functionality of the components in the key management controller 102 may be incorporated into a single controller, such as the key management controller 102 shown in FIG. 1. Alternatively, the functionality of the key management controller 102 may be distributed among a plurality of controllers (not shown). Controller inputs and outputs may be received and passed between controllers via a network, dedicated communication wires, and/or the like.

The encryption engine 104 may be in electronic communication with the key management controller 102 for receiving the encryption key 110 and/or the verification data element 112 from the key management controller 102. In general, the encryption engine 104 may be a computer or other logical device which executes application programs and/or which performs other logical exercises in connection with the encryption key 110 to selectively generate cipher text from (i.e., selectively encrypt) a data packet.

In at least one embodiment, the encryption engine 104 may be electronically coupled (i.e., in electronic communication) with a memory device 106 for storing the encryption key 110 and/or the verification data element 112. In general, the memory device 106 may be any suitable device for retrievably storing the encryption key 110 and/or the verification data element 112, such as a random access memory device, a flash memory device, an EPROM, and EEPROM, and/or the like.

The verification engine 108 is generally configured to receive the encryption key 110 and the verification data element 112. In at least one preferred embodiment, the verification engine 108 may receive the encryption key 110 and the verification data element 112 prior to encryption of each data packet. Such an embodiment may provide the greatest likelihood of detecting a corrupt encryption key prior to application of the corrupt encryption key to a data packet. However, the verification engine 108 may receive the encryption key 110 and the verification data element 112 periodically and/or at any appropriate time to meet the design criteria of a particular application. In addition, the verification engine 108 may receive the encryption key 110 and the verification data element 112 from the encryption engine 104, the memory device 106, and/or any appropriate component of the system 100 to meet the design criteria of a particular application.

The verification engine 108 generally determines when the verification data element 112 corresponds to the encryption key 110 as received by the verification engine 108. In at least one embodiment, the verification engine 108 determines correspondence between the verification data element 112 and the encryption key 110, as received, by applying the same algorithm (e.g., Cyclic Redundancy Check algorithm, etc.) and/or other appropriate technique applied by the key management controller 102 to the encryption key 110 and comparing the result with the verification data element 112. However, the verification engine 108 may determine correspondence between the verification data element 112 and the encryption key 110 using any appropriate technique to meet the design criteria of a particular application.

The verification engine 108 is generally in electronic communication with the encryption engine 104 and may be configured to selectively allow encryption of a data packet by the encryption engine 104 when the verification data element 112 corresponds to the encryption key 110, as received by the verification engine 108. By contrast, the verification engine 108 is generally configured to prohibit encryption of a data packet by the encryption engine 104 when the verification data element 112 does not correspond to the encryption key 110, as received by the verification engine 108. By prohibiting encryption of the data packet, the data packet may be preserved for subsequent encryption using a valid encryption key.

Furthermore, in at least one embodiment, the verification engine 108 may be configured to refresh the encryption key 110 and/or the verification data element 112 when the verification data element 112 does not correspond to the encryption key 110, as received by the verification engine 108. In a particular embodiment, the verification engine 108 may be configured to refresh the encryption key 110 and/or the verification data element 112 by requesting a valid encryption key and corresponding verification data element from the key management controller 102.

Furthermore, in at least one embodiment, the verification engine 108 may be integrated with the encryption engine 104 such that the verification engine 108 and the encryption engine 104 reside within a single physical device (e.g., Application Specific Integrated Circuit, Field Programmable Gate Array, and/or the like).

It should be understood that any component (e.g., 102, 104, 106, 108, etc.) of the system 100 may be in electronic communication with (e.g., via a network, via a satellite communication system, via a hand carried data storage device, etc.) any number of other components (e.g., 102, 104, 106, 108, etc.) of the system 100 to meet the design criteria of a particular application. For example, the verification engine 108 may receive the encryption key 110 and/or the verification data element 112 from the encryption engine 104, the memory device 106, and/or any other appropriate component of the system 100 to meet the design criteria of a particular application.

Figure 2:
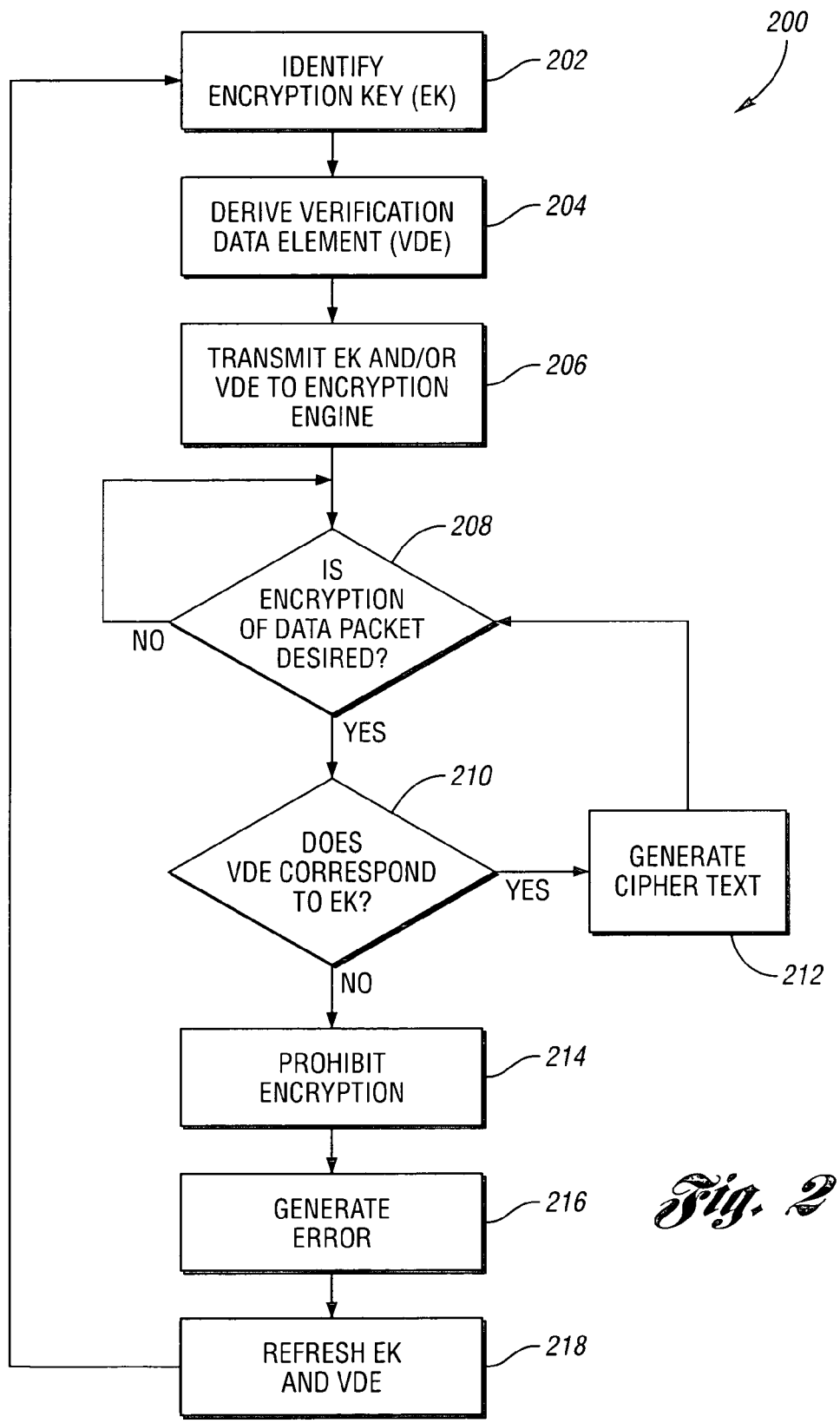
FIG. 2 is a block diagram of a method for selectively encrypting a data packet according to an embodiment of the present invention.

Referring to FIG. 2, a block diagram is provided of a method 200 for selectively encrypting a data packet according to an embodiment of the present invention. The method 200 may be advantageously implemented in connection with the system 100, described previously in connection with FIG. 1, the system 300, described subsequently in connection with FIG. 3, and/or any appropriate system to meet the design criteria of a particular application. In particular the method 200 is generally performed in whole or part by one or more logical devices, such as the key management controller 102, the encryption engine 104, the verification engine 108, and/or the like. The method 200 generally includes a plurality of blocks or steps that may be performed serially. As will be appreciated by one of ordinary skill in the art, the order of the blocks/steps shown in FIG. 2 is exemplary and the order of one or more block/step may be modified within the spirit and scope of the present invention. Additionally, the blocks/steps of the method 200 may be performed in at least one non-serial (or non-sequential) order, and one or more blocks/steps may be omitted to meet the design criteria of a particular application. Similarly, two or more of the blocks/steps of the method 200 may be performed in parallel.

At step 202, an encryption key (e.g., 110) may be identified (i.e., generated, assigned, selected from a set of predetermined encryption keys, etc.) for subsequent use by an encryption engine (e.g., 104) to encrypt a data packet. In at least one embodiment, the encryption key may be identified by a key management controller (e.g., 102). However, any appropriate apparatus, device and/or technique may be implemented to identify the encryption key to meet the design criteria of a particular application. From step 202, the method 200 generally proceeds to step 204.

At step 204, a verification data element (e.g., 112) may be derived (i.e., generated, determined, etc.) to correspond to the encryption key. In at least one embodiment, the verification data element may be derived using the key management controller and/or any appropriate algorithm, such as a Cyclic Redundancy Check algorithm, and/or any other appropriate technique to meet the design criteria of a particular application. From step 204, the method 200 generally proceeds to step 206.

At step 206, the encryption key and/or verification data element may be transmitted to the encryption engine using any appropriate apparatus, such as a network, dedicated communication wires, portable data storage device, and/or the like, to meet the design criteria of a particular application. In at least one embodiment, the verification data element may be logically coupled (e.g., appended, prefixed, attached, integrated, etc.) to the encryption key such that the verification data element is transmitted and/or otherwise conveyed with the encryption key as a single data unit. However, the verification data element and the encryption key may be transmitted as any appropriate number of data units to meet the design criteria of a particular application. Furthermore, as illustrated in FIG. 2, the verification data element may be derived (step 204) prior to transmitting the encryption key to an encryption engine (step 206). Such an embodiment may provide for detection of encryption key corruption during the transmission. However, the order of steps 204 and 206 may be modified within the spirit and scope of the present invention to meet the design criteria of a particular application. From step 206, the method 200 generally proceeds to decision block 208.

Decision block 208 generally determines when encryption of a data packet is desired. The method 200 generally proceeds to decision block 210 when encryption of a data packet is desired (i.e., the YES leg of decision block 208). This typically occurs in response to the presentation of user data to the encryption engine. The method 200 may remain at step 208 when encryption of a data block is not desired, this corresponds to the NO leg of decision block 208.

Decision block 210 generally determines if the verification data element corresponds to the encryption key at the time encryption of a data packet is desired. In at least one embodiment, a verification engine (e.g., 108) may be used to determine correspondence between the verification data element and the encryption key. However, any appropriate apparatus may determine correspondence between the verification data element and the encryption key using any appropriate technique to meet the design criteria of a particular application. The method 200 generally proceeds to step 212 when the verification data element corresponds to the encryption key at the time encryption of a data packet is desired (i.e., the YES leg of decision block 210). In contrast, the method 200 generally proceeds to step 214 when the verification data element does not correspond to the encryption key at the time encryption of a data packet is desired (i.e., the NO leg of decision block 210).

At step 212, cipher text (i.e, encrypted data) may be generated from the data packet and the encryption key by any appropriate device, such as the encryption engine. From step 212, the method 200 may return to step 208.

Accordingly, in at least one embodiment, correspondence of the verification data element with the encryption key may be verified prior to encryption of each data packet such that loss of data due to a corrupted encryption key may be reduced.

At step 214, encryption of the data packet, for example by the encryption engine, may be prohibited when encryption of the data packet is desired and the verification data element does not correspond to the encryption key. Accordingly, in at least one embodiment, data loss as a result of encrypting the data packet with a corrupted encryption key may be significantly reduced. In general, subsequent recordation of the still unencrypted data packet on a data media unit may be prohibited when the verification data element does not correspond to the encryption key. From step 214, the method may proceed to step 216.

At step 216, an error may be generated. In one embodiment, a system error message may be generated in response to the error. In another embodiment, an audio and/or visual alarm may be generated in response to the error. In yet another embodiment, a counter may be incremented or decremented in response to the error. In still yet another embodiment, no action may result from the generation of the error. However, any appropriate action or inaction may be initiated as a result of the error to meet the design criteria of a particular application. From step 216, the method 200 may proceed to step 218.

At step 218, the encryption key and/or the verification data element may be refreshed when encryption of the data packet is desired and the verification data element does not correspond to the encryption key. Furthermore, in at least one embodiment, refreshing the encryption key and/or the verification data element may include requesting a valid encryption key and/or corresponding verification data element from an appropriate apparatus, such as the key management controller. In at least one embodiment, the method 200 may return to step 202 from step 218.

In accordance with various embodiments of the present invention, the methods described herein may be implemented as programs running on a processor, such as a computer processor. Dedicated hardware implementations can likewise be constructed to implement the methods described herein. It should also be noted that the program implementations of the present invention as described herein are optionally stored on a tangible storage medium, such as a magnetic medium, a magneto-optical or optical medium, or a solid state medium. Accordingly, the invention is considered to include a tangible storage medium or distribution medium, as listed herein and including art-recognized equivalents and successor media, in which the program implementations herein are stored.

Figure 3:
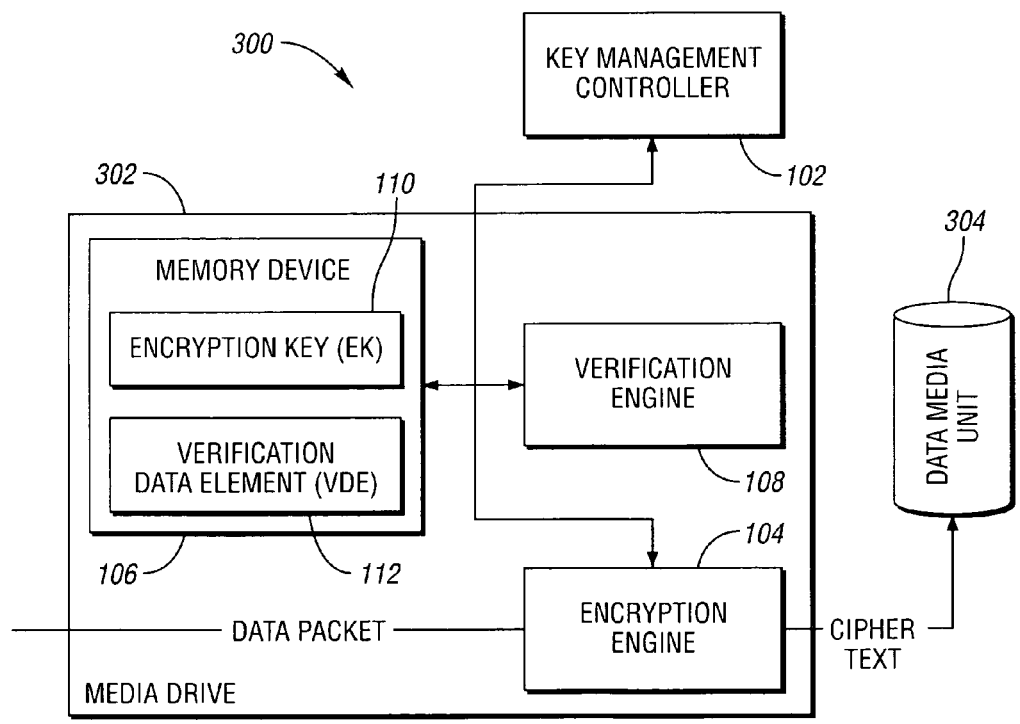
FIG. 3 is a schematic diagram of a media drive for selectively encrypting a data packet according to an embodiment of the present invention.

Referring to FIG. 3, a schematic diagram is provided of a system 300 including a media drive 302 for selectively encrypting a data packet according to an embodiment of the present invention. In general, the system 300 may be implemented similarly to the system 100 with like element numbers indicating similar elements between the systems 100 and 300. As illustrated in FIG. 3, the encryption engine 104, the verification engine 108 and/or the memory device 106 of the system 300 may be integrated within the media drive 302. As further illustrated in FIG. 3, the key management controller 102 may be implemented as a device that is physically separate from but in electronic communication with (e.g., via a network, via a satellite communication system, via a hand carried data storage device, etc.) one or more components of the media drive 302. Furthermore, the encryption engine 104 may be electronically coupled (i.e., in electronic communication) with a data media unit 304, (e.g., magnetic tape, optical tape, magnetic disk, optical disk, holographic tape, holographic disk, etc.) for recording (i.e., writing) and/or reading cipher text to/from the data media unit 304, respectively.

In at least one embodiment, the media drive 302 may be a tape drive, such as a magnetic tape drive, an optical tape drive, a holographic tape drive, and/or the like. In at least one other embodiment, the media drive 302 may be a disk drive, such as a magnetic disk drive, an optical disk drive, a holographic disk drive, and/or the like. However, the media drive 302 may be any appropriate apparatus for recording and/or reading data, such as cipher text, to/from, respectively, a data media unit 304 to meet the design criteria of a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for selectively encrypting a data packet,
   the system comprising tangible storage media, the system further comprising:
   an encryption key stored on the media for use in encrypting the data packet;
   a verification data element stored on the media derived from the encryption key;
   an encryption engine stored on the media for selectively encrypting the data packet using the encryption key; and
   a verification engine stored on the media in electronic communication with the encryption engine, wherein the verification engine is configured to:
   receive the encryption key and the verification data element;
   determine when the verification data element corresponds to the encryption key as received by the verification engine; and
   prohibit encryption of the data packet by the encryption engine when the verification data element does not correspond to the encryption key as received by the verification engine;
   wherein the verification data element is derived from the encryption key using an algorithm;
   wherein the verification data element comprises an encryption tag generated using the algorithm and the algorithm is configured to obscure the encryption key during transmission from a key management controller to the encryption engine.

2. The system of claim 1 wherein the verification engine is further configured to refresh the encryption key and the verification data element when the verification data element does not correspond to the encryption key as received by the verification engine.

3. The system of claim 2 wherein the verification engine is configured to refresh the encryption key and the verification data element by requesting a valid encryption key and corresponding verification data element from the key management controller.

4. The system of claim 3 wherein the encryption engine and the verification engine are integrated within a media drive and the key management controller is physically separate from the media drive.

5. The system of claim 1 wherein the encryption engine and the verification engine are integrated within a media drive.

6. The system of claim 5 wherein the media drive is at least one of a tape drive and a disk drive.

7. The system of claim 1 wherein the encryption key and the verification data element are stored in a memory device in electronic communication with at least one of the encryption engine and the verification engine.

8. The system of claim 1 wherein the algorithm is a Cyclic Redundancy Check algorithm.

9. The system of claim 1 wherein the verification data element is logically coupled to the encryption key such that the verification data element is transmitted with the encryption key as a single data unit.

10. A method for selectively encrypting a data packet using an encryption key, the method comprising:
    deriving a verification data element corresponding to the encryption key prior to transmitting the encryption key to an encryption engine;
    transmitting the encryption key and the verification data element to the encryption engine;
    determining when encryption of the data packet is desired;
    determining if the verification data element corresponds to the encryption key when encryption of the data packet is desired; and
    prohibiting encryption of the data packet by the encryption engine when encryption of the data packet is desired and the verification data element does not correspond to the encryption key;
    wherein the verification data element is derived from the encryption key using an algorithm;
    wherein the verification data element comprises an encryption tag generated using the algorithm and the algorithm is configured to obscure the encryption key during transmission from a key management controller to the encryption engine.

11. The method of claim 10 further comprising refreshing the encryption key and the verification data element when encryption of the data packet is desired and the verification data element does not correspond to the encryption key.

12. The method of claim 11 wherein refreshing the encryption key and the verification data element includes requesting a valid encryption key and corresponding verification data element from the key management controller.

13. The method of claim 10 wherein the algorithm is a Cyclic Redundancy Check algorithm.

14. The method of claim 10 further comprising logically coupling the verification data element to the encryption key to form a single data unit such that the encryption key and the verification data element are transmitted to the encryption engine as the single data unit.

* * * * *